Nov. 17, 1959    L. A. DAHL ET AL    2,912,924
MEAT PRODUCT SHAPING APPARATUS
Filed Nov. 12, 1957          2 Sheets-Sheet 1
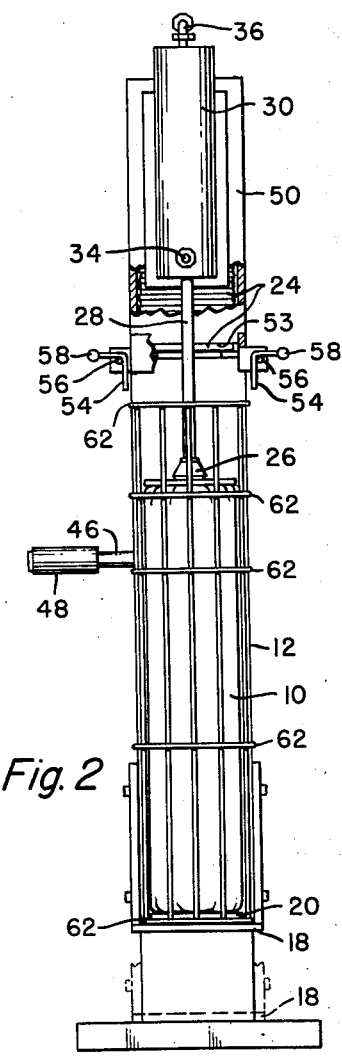
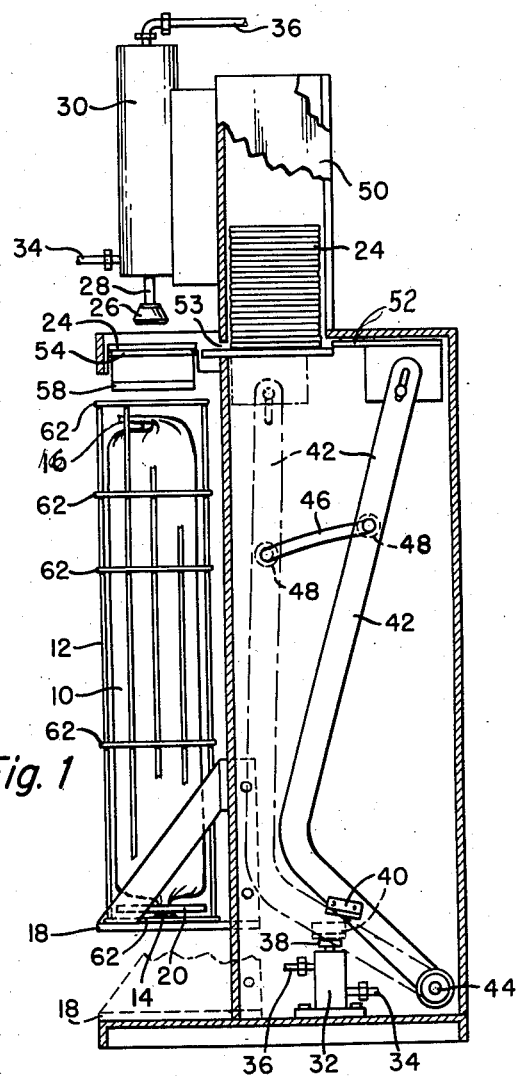
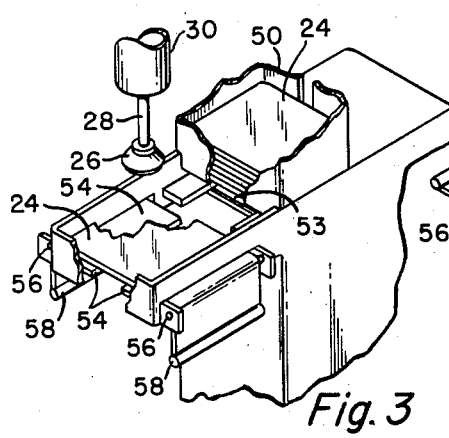
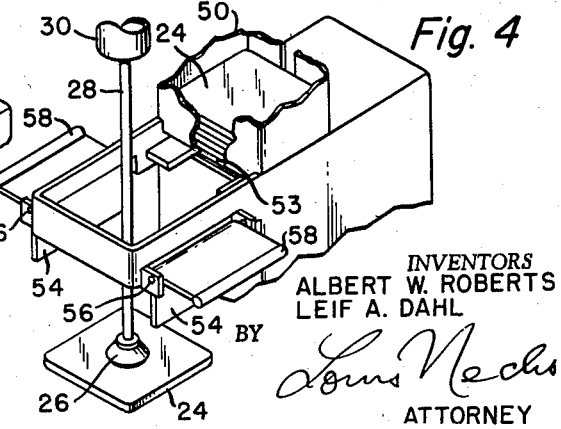
INVENTORS
ALBERT W. ROBERTS
LEIF A. DAHL
BY
ATTORNEY Nov. 17, 1959    L. A. DAHL ET AL    2,912,924
MEAT PRODUCT SHAPING APPARATUS Filed Nov. 12, 1957    2 Sheets-Sheet 2

INVENTORS
ALBERT W. ROBERTS
LEIF A. DAHL
BY
Louis Necho
ATTORNEY

United States Patent Office 2,912,924
Patented Nov. 17, 1959

2,912,924

MEAT PRODUCT SHAPING APPARATUS

Leif A. Dahl, Philadelphia, Pa., and Albert W. Roberts, Berlin, N.J., assignors of one-third to Albert Schuman, one-third to Anthony Edwardi, both of Philadelphia, Pa., and one-third to Albert W. Roberts, Berlin, N.J.

Application November 12, 1957, Serial No. 695,750

2 Claims. (Cl. 100—219)

Preserved meats, such as boned ham, bologna and the like, are packaged in natural or synthetic casings and are then smoked. Meats conventionally packaged are generally cylindrical and their opposite ends are generally rounded or oval. When the grocer sells these meats at retail, the rounded or oval ends must be cut off and discarded because customers only like to buy full-sized slices. This represents considerable waste.

The object of this invention is to produce an improved apparatus for producing packaged meat products, the opposite ends of which are squared off and are of full size so that the first slice cut off from either end of a meat package will be saleable, thus eliminating the waste above referred to.

The full nature of the invention will be understood from the following specification and the accompanying drawings in which:

Fig. 1 is a side elevational view of an apparatus embodying the invention.

Fig. 2 is an end elevational view of the same.

Figs. 3 and 4 are enlarged fragmentary perspective views showing details of construction.

A meat package 10 of the type referred to is placed in a cage 12, which is made of wire or the like, so as to expose the meat to the heat and smoke in the curing room. The opposite ends of the meat package are initially open with one end of the package tied, as at 14, and with the other end of the package folded over, as at 16. The machine embodying this invention includes a platform 18, which may be raised to the upper position shown in solid lines in Fig. 1 when the cages being used are relatively short or which may be moved to the position shown in broken lines in Fig. 1 to accommodate cages which are relatively long. The cage can also be moved to any desired intervening position.

Figure 5:
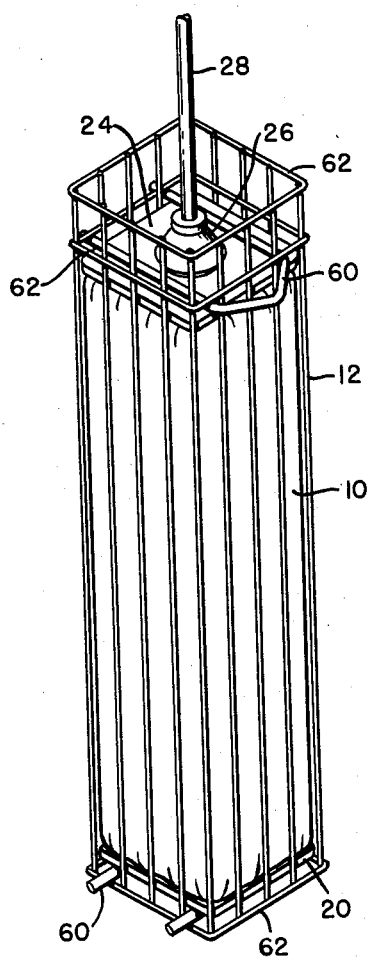
Fig. 5 is a perspective view of the cage in which the meat packaged is processed.
Figure 8:
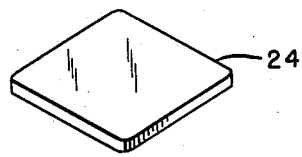
Fig. 8 is a perspective view of the plate used for squaring off the upper end of the meat package.
Figure 9:
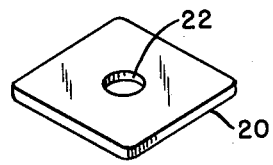
Fig. 9 is a perspective view of the plate shown below the meat package in Fig. 6.
Figure 6:
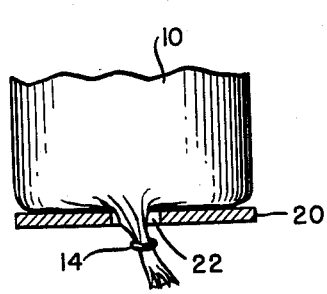
Fig. 6 is an enlarged fragmentary view, partly in perspective and partly in elevation of the lower portion of a meat package and the lower plate used in squaring off the lower end of the meat package.

The lower, sealed end of the meat package is squared off by a plate 20, which is placed in the bottom of the cage and has a hole 22, through which the tied end 14 of the meat package passes, as best shown in Figs. 1 and 6. In order to square off the upper or folded end 16 of the meat package, a solid, or unperforated plate 24, such as that shown in Fig. 8, is placed on the upper end of the meat package, as best shown in Figs. 2 and 5. Pressure is applied to the meat package by means of a head 26 which is carried by the piston 28 of a double acting air cylinder 30. Air cylinder 30 is supplied with compressed air through a two-position air valve 32, and the arrangement being such that, when air flows through pipe 34, the piston 28 of the air cylinder is raised to the position shown in Fig. 1 and, when air flows through pipe 36, the piston 28 of the air cylinder will move downwardly to compress the meat package, as shown in Fig. 2.

Air valve 32 is provided with a stem 38 which is spring loaded and is normally biased into a position in which air flows through pipe 34 to raise, and to keep piston 28 into the upper position of Fig. 1 in which head 26 is out of engagement with the meat package. Valve stem 38 of air valve 32 is adapted to be depressed, to permit air to flow through pipe 36, by means of a lug or angle 40 which is carried by a lever 42 which is pivoted to a fixed support at 44. Lever 42 is connected by a link 46 to a handle 48, whereby, when handle 48 is moved to the left, as viewed in the drawings, lever 42 and angle 40 will move to the broken line position in Fig. 1 in which angle 40 engages and depresses valve stem 38. Lever 42 may be spring loaded so as automatically to return to the solid line position of Fig. 1, or it may be returned to the solid line position by moving handle 48 to the right, as viewed in Fig. 1.

In order to avoid having to place the upper plates 24 in position manually, we stack a number of these plates in a receptacle 50 and we provide the upper end of lever 42 with a pusher 52 which is adapted to pass through a slot 53 in the bottom of container 50 so that, every time lever 42 is moved to the broken line position in Fig. 1, pusher 52 will eject the lowermost plate 24 from the bottom of container 50. The action of pusher 52 is so timed that it completes the ejection of a plate 24 before angle 40 has completed depressing valve stem 38, so that the ejected plate 24 will be ready and in position below disc 26 before valve stem 38 begins to move downwardly.

Figure 7:
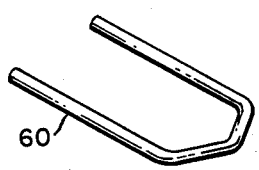
Fig. 7 is a perspective view of a retaining pin which is shown in heavy shading at the top of Fig. 5.

In order to receive and accurately position the ejected plate 24 with reference to the top of the meat package, we provide opposite shelves or platforms 54, which are pivoted at 56 and which are provided with counterweights 58, which operate to maintain shelves 54 in the horizontal position shown in Fig. 3 in which they receive and center the plate 24 ejected by pusher 52. When piston 26 moves downwardly, it rotates shelves 54 from the position of Fig. 3 to the out-of-the-way position of Figs. 2 and 4 in which the shelves assume a substantially vertical position to permit the plate initially deposited thereon, to move downwardly and into engagement with the meat package, as shown in Fig. 2. As soon as the plate 24 and head 26 have been moved downwardly past shelves 54, the shelves move back from the vertical position shown in Figs. 2 and 4 to the horizontal position shown in Fig. 3 so as to be ready to receive the next plate 24. When the meat package has been sufficiently compressed, a pin 60, such as that shown in Fig. 7, is inserted between the nearest horizontal wires of the cage so as to retain the meat package in its compressed position after piston 28 and head 26 have been retracted and while the meat package is being cured in the smoking room.

In operation, the lower plates 20 are placed in the bottoms of the cages, the meat packages are placed in the cage with their tied ends 14 projecting through the holes 22 of the plates and platform 18 is adjusted according to the length of the cages being used. The cages are then successively placed on the platform and handle 14 is pushed to the left to eject a plate onto horizontally disposed shelves 54 and to operate air valve 32 to cause air to flow through pipe 36 to depress head 26 into engagement with the top of the package. When piston 28 reaches the end of its stroke, the U-shaped pin 60 of Fig. 7 is inserted, as shown in dark shading in Fig. 5 and, upon retraction of piston 28 by the return movement of handle 48, the cage is removed from platform 18 and conveyed to the smoking room by an automatic conveyor, or otherwise. A meat package thus processed will have its opposite ends properly squared off and ready for cutting into saleable slices.

What we claim is:

1. Apparatus for squaring the ends of a casing stuffed with a pliable meat product, said casing having its bottom end gathered and sealed, said apparatus including a fenestrated receptacle for containing said casing, a first, rectilinear thrust plate placed in said receptacle below the bottom end of said casing, said first plate having an opening therein through which the gathered end of said casing passes to bring the remaining area of the bottom end of the casing into contact with said first plate, a plurality of second thrust plates positioned near the top end of said casing and arranged to be fed one at a time to said receptacle at a point above said casing, a double acting air cylinder, a piston therefor, said piston being movable to a first position in which it applies compressive pressure against the top of said casing, and to a second position in which it is spaced from the top of said casing and from the top of said receptacle, a two-way air valve, a stem for moving said air valve to a first position in which said piston is moved to its first position and to a second position in which said piston is moved to its second position, means normally biasing said stem to its second position, a pivoted arm movable into engagement with said stem at will, to move said stem to its first position, a pusher carried by said arm and operable, on movement of said arm toward said valve stem to push one of said second plates into the receptacle located above the top end of said casing, means synchronizing the operation of said pusher with the actuation of said valve stem by said arm whereby said pusher moves one of said second thrust plates into position above the top of said casing immediately before said valve is moved to its first position by said arm, pivoted shelves mounted in said receptacle at a point located above the top end of said casing, and in the path of movement of said piston for supporting said second thrust plate pending movement of said piston to its first position, and counterweights carried by said shelves for normally retaining said shelves in plate-receiving position.

2. The structure recited in claim 1 and a pin insertable through an opening in said receptacle immediately above said second thrust plate while said piston is in its first position to retain said thrust plate in its compressive position relative to said casing.

References Cited in the file of this patent

UNITED STATES PATENTS

| | | |
|---|---|---|
| 1,388,082 | Wolff | Aug. 16, 1921 |
| 1,412,021 | Welger | Apr. 4, 1922 |
| 1,624,808 | Scholten | Apr. 12, 1927 |
| 1,835,628 | Bellinghausen | Dec. 8, 1931 |
| 1,936,814 | Wetta | Nov. 28, 1933 |
| 2,084,806 | Hubenet | June 22, 1937 |